United States Patent [19]
Tanabe et al.

[11] Patent Number: 5,039,480
[45] Date of Patent: Aug. 13, 1991

[54] METHOD FOR MANUFACTURING MOLTEN METAL CONTAINING NI AND CR

[75] Inventors: Haruyoshi Tanabe; Chihiro Taki; Katsuhiro Iwasaki; Masahiro Kawakami; Toshio Takaoka, all of Tokyo, Japan

[73] Assignee: NKK Corporation, Tokyo, Japan

[21] Appl. No.: 475,675

[22] Filed: Feb. 6, 1990

[30] Foreign Application Priority Data

| Feb. 21, 1989 | [JP] | Japan | 1-042277 |
| Feb. 21, 1989 | [JP] | Japan | 1-042278 |
| Apr. 18, 1989 | [JP] | Japan | 1-098152 |
| Apr. 27, 1989 | [JP] | Japan | 1-108897 |

[51] Int. Cl.$^5$ ............................................ C22C 30/00
[52] U.S. Cl. ...................................... 420/588; 420/71
[58] Field of Search ................ 420/71, 115, 588, 590

[56] References Cited

U.S. PATENT DOCUMENTS

| 4,410,360 | 10/1983 | Katayama et al. | 420/71 |
| 4,504,311 | 3/1985 | Weiner | 75/ |

FOREIGN PATENT DOCUMENTS

| 58215 | 4/1983 | Japan | 420/119 |
| 58-104153 | 6/1983 | Japan | |
| 164715 | 9/1983 | Japan | 420/71 |
| 60-36613 | 2/1985 | Japan | |
| 61-279608 | 12/1986 | Japan | |
| 61-291911 | 12/1986 | Japan | |

Primary Examiner—Melvyn J. Andrews
Attorney, Agent, or Firm—Frishauf, Holtz, Goodman & Woodward

[57] ABSTRACT

A method for manufacturing molten metal containing Ni and Cr comprises a process of smelting and reducing Ni ore, and a process of smelting and reducing Cr ore.

The process of smelting and reducing Ni ore comprises the steps of charging molten iron into a smelting reduction furnace having a top-blow oxygen lance and tuyeres for blowing stirring gas, charging Ni ore, carbonaceous material and flux into the smelting reduction furnace, blowing decarbonization oxygen and post-combustion oxygen from the top-blow oxygen lance into the smelting reduction furnace, blowing stirring gas for stirring the molten metal and slag inside the smelting reduction furnace from the tuyeres, and controlling post-combustion ratio $[(H_2O+CO_2)/(H_2+H_2O+CO+CO_2)]$ at 0.3 or more.

The process of smelting and reducing said Cr ore comprises charging Cr ore, carbonaceous material and flux into the smelting reduction furnace holding the molten metal containing Ni, blowing decarbonization oxygen and post-combustion oxygen from the top-blow oxygen lance into the smelting reduction furnace, blowing stirring gas for stirring the molten metal and slag inside the smelting reduction furnace from the tuyeres, and controlling post-combustion ratio $[(H_2O+CO_2)/(H_2+H_2O+CO+CO_2)]$ at 0.3 or more.

18 Claims, 11 Drawing Sheets

METHOD FOR MANUFACTURING MOLTEN METAL CONTAINING NI AND CR

BACKGROUND OF THE INVENTION

1. Field of the Invention

The present invention relates to a method for manufacturing molten metal containing Ni and Cr by directly smelting and reducing Ni ore and Cr ore in a smelting reduction furnace by the use of carbonaceous material as fuel or reducing material.

2. Description of the Prior Art

Materials such as scrap, ferro alloy, electrolytic Ni or the like have previously been used in melting and refining in a process of manufacturing stainless steel. Those materials are melted in an electric furnace or a converter. Cr and Ni being major components of stainless steel in the state of ferrochrome and ferronickel are charged into the electric furnace or the converter. Chromium ore and nickel ore are required to be previously reduced in the electric furnace or the like to manufacture ferrochrome and ferronickel. Expensive electric energy is used for reducing chromium ore and nickel ore. Accordingly, a method wherein ferrochrome and ferronickel are used as materials is not economical method.

On the other hand, four methods, which will be described as follows, are pointed out as methods of using inexpensive material for a source of Ni. A first method is a method wherein molten metal of FeNi is directly used in an electric furnace for the purpose of reducing a cost of melting FeNi. This method is described in the magazine "Iron and Steel" [69 (1983) 7, p. 59]. A second method is a method for smelting and reducing nickel matte in a converter which is disclosed in a Japanese Patent Publication Laid Open No. 104153/83. A third method is disclosed in a Japanese Patent Publication Laid Open No. 36613/85. In this method, material produced by mixing nickel oxide with carbonaceous material and forming a mixture thus obtained is heated and prereduced and the material prereduced is charged into a converter type reaction vessel, in which it is smelted and reduced. A fourth method is a method wherein nickel oxide is used (a Japanese Patent Publication Laid Open No. 291911/86).

Moreover, several methods wherein Cr ore is used as a source of Cr and Cr ore is smelted and reduced in a converter or other melting furnaces have been proposed. There are known, for example, a method wherein Cr ore is smelted and reduced by blowing oxygen from a top-blow oxygen lance and, at the same time, blowing oxygen from bottom-blow tuyeres and blowing nitrogen from side-blow tuyeres and a method wherein Cr ore is smelted and reduced by blowing oxygen from bottom-blow tuyeres and oxygen and nitrogen from side-blow tuyeres respectively. As an example of the latter, Japanese Patent Publication Laid Open No. 279608/86 can be pointed out.

Next, problems of the prior art will be studied. In the prior art method for manufacturing molten metal containing Ni, Ni ore is not smelted and reduced by directly charging Ni ore into the smelting furnace. Since Ni ore has a low content of 2 to 3 wt. % Ni and about 80% of weight of Ni ore converts to slag, Ni ore produces a great amount of slag during smelting reduction of the Ni ore. Accordingly, when it is tried to obtain a predetermined concentration of Ni, a great amount of slag is produced. For example, when molten metal containing 8 wt. % Ni is obtained, 2 to 3 t of slag per ton of molten metal are produced. In connection with the production of a great amount of slag, the following problems become remarkable.

(1) Slopping is liable to be produced by a reaction of oxygen with carbonaceous material charged into the smelting reduction furnace as a reducing material or as a heat source at the step of the smelting reduction. In consequence, a stable operation becomes difficult whereby the operation becomes unstable.

(2) Equipment is greatly damaged by the slopping; and (3) The yield of Ni is decreased by the slopping.

In view of the foregoing problems, in the foregoing citations, Ni ore as a source of Ni is not directly charged into the smelting reduction furnace, but material having a content of Ni, whose percentage in the material is increased by subjecting the material to some preliminary treatment, is used.

On the other hand, since chromium oxide as a source of Cr is difficult to melt and considerable energy is required to reduce chromium oxide, a rate of reduction of chromium oxide in the prior art smelting reduction methods is small and requires much time to process chromium oxide. Such problems are posed by the following reasons:

① A reduction of Cr ore in the smelting reduction furnace progresses under the reaction of C in the carbonaceous material with melted Cr ore after the Cr ore has been melted in slag. The rate of reduction of Cr ore is strongly affected by the rate of melting of Cr ore. Therefore, major technical attention for shortening a processing time has been paid to a determination of slag components or the like. However, Cr ore is fundamentally hard to melt and there is a limit of increasing the rate of reduction of the Cr ore by promoting the melting of the Cr ore.

② A method, wherein CO gas in the melting furnace is post-combusted and post-combustion heat is used to increase a melting rate of Cr ore in slag and to increase a reaction rate of the Cr ore, is conceivable. A method of blowing post-combustion oxygen from an upper portion of walls of the melting furnace is employed in the prior art methods as well. In the prior art, however, although a temperature of exhaust gas rises when a post-combustion ratio is raised, there is no technology for effectively transferring sensible heat of the exhaust gas to molten metal. As the result, the heat transfer efficiency decreases and high-temperature exhaust gas is exhausted. There occurs a problem such that the high-temperature exhaust gas cause rapid wearing of the refractory of an exhaust gas hood. Therefore, it has been generally thought that the post-combustion ratio cannot be raised too high.

Molten metal containing Ni and Cr can be obtained by smelting and reducing Ni ore and Cr ore. The molten metal containing Ni and Cr is subjected to a decarbonization treatment so as to obtain stainless steel. The decarbonization treatment is desired to be continuously carried out in the same furnace as that in which the smelting reduction is carried out. The method wherein decarbonization treatment of molten metal carried out in the same furnace after the smelting reduction of Ni ore and Cr ore has previously not been substantially studied. This is explained by the following reasons:

(1) When the molten metal is subjected to the decarbonization treatment in a converter type vessel, there occurs a problem such that an oxidation loss of Cr is remarkable. Therefore, even though the smelting reduction of Ni ore and Cr ore is practically carried out in the converter type vessel, a vacuum method such as a RH-OB method, in which the oxidation loss of Cr is small, has to be adopted for the decarbonization treatment.

(2) A great amount of stirring gas is required in the decarbonization treatment. In the prior art smelting reduction, a great amount of stirring gas necessary to carry out the the decarbonization treatment is not thought to be supplied. Therefore, even though the same converter type vessels are used in the smelting reduction and decarbonization treatment, both of the furnaces have been thought to have different structures.

(3) A great amount of slag produced by the smelting reduction of $Ni_1$ ore and Cr ore is required to be discharged out of the furnace to carry out processes from the smelting reduction to the decarbonization in the same furnace. However, electric furnaces usually used do not have a structure capable of discharging slag.

(4) The time for the smelting reduction and decarbonization is long in the prior art smelting reduction method and decarbonization method. Accordingly, when the smelting reduction and decarbonization are carried out in the same furnace, it takes very much time for carrying out all the treatments. In consequence, industrial operations are hard to carry out due to a decrease of productivity and a great wear of the refractory of the smelting reduction furnace.

SUMMARY OF THE INVENTION

It is an object of the present invention to provide a method for manufacturing molten metal containing Ni and Cr wherein a stable operation can be carried out and the smelting and reduction rate of Ni ore and Cr ore can be increased.

To accomplish the above-described object, the present invention provides a method for manufacturing molten metal containing Ni and Cr, comprising:

a process of smelting and reducing Ni ore, molten metal containing Ni being manufactured; and a process of smelting and reducing Cr ore after having manufactured said molten metal containing Ni;

said process of smelting and reducing Ni ore, comprising the steps of:

charging molten iron into a smelting reduction furnace having a top-blow oxygen lance with a decarbonization nozzle and a post-combustion nozzle and having tuyeres for blowing stirring gas;

charging Ni ore, carbonaceous material and flux into said smelting reduction furnace;

blowing decarbonization oxygen and post-combustion oxygen from said top-blow oxygen lance into said smelting reduction furnace;

blowing stirring gas for stirring the molten metal and slag inside the smelting reduction furnace from said tuyeres; and controlling a post-combustion ratio $[(H_2O+CO_2)/(H_2+H_2O+CO+CO_2)]$ at 0.3 or more.

said process of smelting and reducing said Cr ore, comprising:

charging Cr ore, carbonaceous material and flux into the smelting reduction furnace holding the molten metal containing Ni which has been manufactured by the process of smelting and reducing Ni ore;

blowing decarbonization oxygen and post-combustion oxygen from said top-blow oxygen lance into said smelting reduction furnace;

blowing stirring gas for stirring the molten metal and slag inside the smelting reduction furnace from said tuyeres; and controlling a post-combustion ratio $[(H_2O+CO_2)/(H_2+H_2O+CO+CO_2)]$ at 0.3 or more.

The above objects and other objects and advantages of the present invention will become apparent from the detailed description which follows, taken in conjunction with the appended drawings.

DESCRIPTION OF THE PREFERRED EMBODIMENTS

[C] in molten metal is removed, being converted to CO gas by decarbonization oxygen. This CO gas is converted to $CO_2$ gas, being oxidized by post-combustion oxygen. The heat of reaction produced by the decarbonization and post-combustion is a main heat resource of smelting reduction. The molten metal and slag are strongly stirred by blowing bottom-blow gas for stirring into the molten metal whereby an oxidation reaction, in which CO is converted to $CO_2$, is promoted. Accordingly, when the oxidation reaction is promoted by blowing stirring gas into the smelting reduction furnace, said post-combustion ratio inside the smelting reduction furnace can be kept high. This is greatly effective in increasing the melting rate or reduction rate of Ni ore and Cr ore. The post-combustion ratio is represented by $[(H_2O+CO_2)/(H_2+H_2O+CO+CO_2)]$.

The unit consumption of carbonaceous material per ton of molten metal which is charged into the smelting reduction furnace can be decreased by the increase of the post-combustion ratio in the smelting reduction of Ni ore. Accordingly, an amount of CO gas and $CO_2$ gas being a cause of occurrence of the slopping is decreased. In consequence, the frequency of the occurrence of the slopping is greatly decreased. Moreover, when the heat transfer efficiency is increased by increasing the amount of the bottom-blow gas, an effect of a decrease of the slopping similar to that in the increase of the post-combustion ratio can be produced.

After Ni ore has been smelted and reduced, it is desired to discharge slag and to remove phosphorus from the molten metal. After desulfurization of the molten metal following the dephosphorization, Cr ore is charged into the smelting reduction furnace. This order of processes is very effective in preventing Cr from being oxidized and raising an operation efficiency.

In the smelting reduction of chromium oxide, being an oxide hard to reduce, slag and molten metal are desired to be more strongly stirred under high post-combustion than in the smelting reduction of Ni ore in order to reduce chromium oxide retained in a lower portion of a slag layer by means of C in the molten metal. For this purpose, a side blow of gas in addition to a bottom-blow of gas is effective. In the smelting reduction of Ni ore, the slopping can be decreased by increasing the amount of bottom-blow gas notwithstanding if the side-blow of gas is carried out or not.

Oxygen is blown into the molten metal exclusively from a top-blow oxygen lance in a decarbonization treatment of the molten metal containing Ni and Cr as well. In this case, oxygen is blown into the molten metal, being diluted by inert gas, to lower a partial pressure of oxygen at a portion (hereinafter referred to as "fire spot") where oxygen jet strikes the molten metal. Simultaneously, the molten metal is strongly stirred by supplying inert gas from bottom-blow tuyeres. Decarbonization of the molten metal can be promoted and the oxidation loss of Cr is limited by the dilution of the top-blow oxygen and the strong stirring of the bottom-blow gas.

A case of using oxygen gas as bottom-blow gas is seen in the prior art. In the present invention, however, oxygen gas is not used as the bottom-blow gas. When oxygen gas is used as the bottom-blow gas, a large amount of CO gas is produced in the molten metal and the molten metal is excessively stirred whereby splashes of the molten metal scatter. Scattered splashes of the molten metal react with the post-combustion oxygen. Thereby, the post-combustion of CO gas is prevented and this decreases the post-combustion ratio. Further, in the case of using oxygen as the bottom-blow gas, cooling gas is required to be added to the bottom-blow gas to prevent the tuyeres from being worn by the rise of a temperature of the tuyeres. The use of the foregoing cooling gas increases the cost of manufacturing molten metal and, moreover, increases the splashes of the molten metal by promoting excessively the strong stirring of the molten metal.

Figure 1:
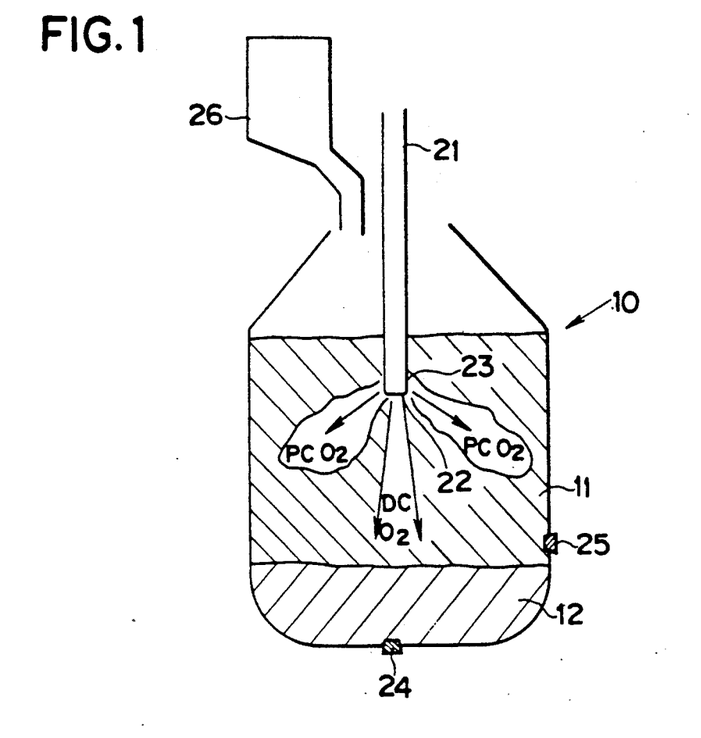
FIG. 1 is a vertical sectional view illustrating a smelting reduction furnace of the present invention.

Subsequently, referring now specifically to the appended drawings, a Preferred Embodiment of the present invention will be described. FIG. 1 is a vertical sectional view illustrating smelting reduction furnace 10 of the Preferred Embodiment of the present invention. In the drawing, reference numeral 21 denotes a top-blow oxygen lance, 22 a decarbonization nozzle, 23 a post-combustion nozzle, 24 a bottom-blow tuyere, 11 a slag layer, 12 molten metal and 26 a hopper for charging Ni ore, Cr ore, carbonaceous material and flux as materials into the smelting reduction furnace.

A method, under the influence of which the high post-combustion ratio can be obtained in a smelting reduction of Ni ore and Cr ore in the smelting reduction furnace constituted in such a manner as described above, will be described.

Heat energy for melting Ni ore and Cr ore is supplied by combustion of carbonaceous material with oxygen, namely, the reaction of $C \rightarrow CO$, $CO \rightarrow CO_2$. Oxygen blown from the decarbonization nozzle 22 arranged in the top-blow oxygen lance 21 reacts mainly with carbon [C] in molten metal and and converts it to CO. Oxygen blown from the post-combustion nozzle 23 reacts with said CO and converts it to $CO_2$. Oxygen blown from the decarbonization nozzle 22 is represented by DC $O_2$; oxygen blown from the post-combustion nozzle 23 is represented by PC $O_2$. The post-combustion ratio is increased by arranging the above-described two nozzles 22 and 23.

In the present invention, a high post-combustion is realized by forming the post-combustion zone mainly in a slag layer and, at the same time, a high heat transfer efficiency can be obtained. Accordingly, said post-combustion oxygen is desired to be blown into the slag so that the post-combustion zone can be formed mainly in the slag. Thereby, the post-combustion ratio of 0.3 or more can be secured and a high reduction rate of Ni ore and Cr ore can be obtained, the unit consumption of carbonaceous material per ton of molten metal being decreased during the reduction of Ni ore and Cr ore.

Figure 2:
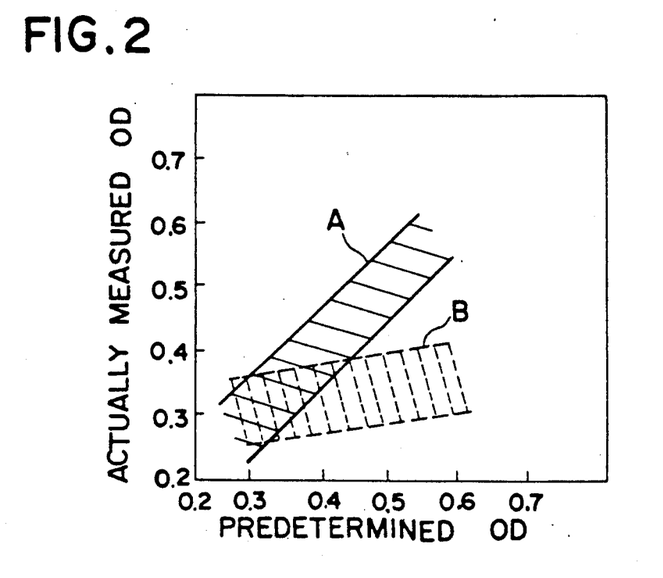
FIG. 2 is a graphical representation showing the relation between a predetermined post-combustion ratio and a measured post-combustion ratio of the present invention.

In the present invention, oxygen is not desired to be used as stirring gas. When oxygen is used as the stirring gas, a great amount of CO gas is produced in molten metal and the molten metal is strongly stirred whereby PC $O_2$ reacts with C in the molten metal and the post-combustion is prevented. FIG. 2 is a graphical representation showing a comparison of the case of using $N_2$ gas as the stirring gas with the case of using oxygen as the stirring gas. The case of using $N_2$ as the stirring gas is shown with A in FIG. 4 and the case of using oxygen with B in FIG. 4. The axis of abscissa is represented with the predetermined post-combustion ratio $[(PC\ O_2/(DC\ O_2+O_2\ in\ ore)]$. The axis of ordinate is represented with the measured post-combustion combustion ratio $[(H_2O+CO_2)/(H_2+H_2O+CO+CO_2)]$. OD is an abbreviation of the post-combustion ratio. In case oxygen gas is used as the stirring gas, the measured post-combustion ratio is lower than the predetermined post-combustion ratio. Therefore, it is understood that the post-combustion is prevented by a bottom-blowing of $O_2$.

Said predetermined post-combustion ratio is a post-combustion ratio based on the assumption that all the PC $O_2$ has been consumed for the post-combustion and all of (DC $O_2$ + $O_2$ in ore) has been consumed for oxidizing carbon in the molten metal. Accordingly, the closer the measured post-combustion ratio is to said predetermined post-combustion ratio, the better the post-combustion ratio of PC $O_2$ is.

Inert gas such as CO, $N_2$ or Ar which is the stirring gas can be used as a single gas or mixed with each other.

Next, a process of the smelting reduction of Ni ore by the use of the smelting reduction furnace 10 wherein a high post-combustion ratio can be obtained will be described. Firstly, molten metal is charged into the smelting reduction furnace. Secondly, after a temperature of the molten metal has been raised to about 1500° C. by charging carbonaceous material into the smelting reduction furnace and supplying oxygen from the top-blow oxygen lance 21, Ni ore begins to be charged into the smelting reduction furnace. Stirring gas is blown from bottom-blow tuyere 24 and side-blow tuyere 25 into the smelting reduction furnace from the moment when the molten metal is charged into the smelting reduction furnace so that the tuyeres cannot be blocked and a blowing-in amount of the stirring gas is increased if necessary. However, the stirring gas is not required to be actively blown from the side-blow tuyere 25 during the smelting reduction of Ni ore. The stirring gas from the side-blow tuyere 25 can be blown at such a rate that the tuyere cannot be blocked. This is because the effect of stirring by the side-blow gas is not greatly observed.

A metal content of Ni ore generally used is about 20%. Out of the metal content, Ni content is about 2 to 3%. The other 80% of the metal content is slag. About 90% by weight of Ni ore convert to slag, slag component of flux other than the slag component in Ni ore being added to the above-mentioned slag. Accordingly, 2 to 3 tons of slag are produced to obtain molten metal of 8 wt. % Ni. Since an apparent density of slag is about 0.5 to 1.0 due to CO gas or $CO_2$ gas included into the slag, a volume of the slag is about 10 to 20 times larger than that of the molten metal. In case a great amount of CO gas or $CO_2$ gas is produced, slopping occurs. This prevents a stable operation and there can be a break of an operation and damages of equipment and machinery.

Figure 3:
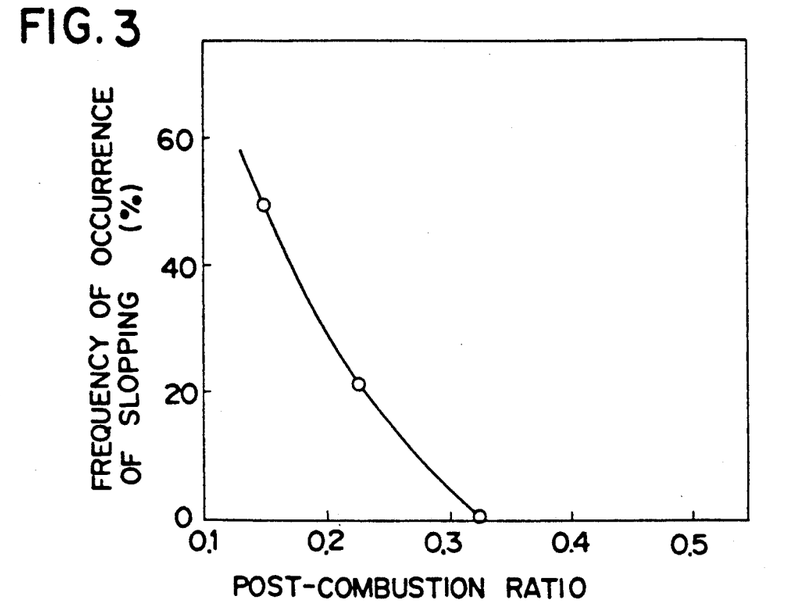
FIG. 3 is a graphical representation showing the relation between a post-combustion ratio and frequency of occurrence of slopping of the present invention.

From this point of view, the present inventors studied factors of producing the slopping. FIG. 3 is a graphical representation showing the relation between a post-combustion ratio inside a smelting reduction furnace and frequency of occurrence of the slopping. Test conditions were as follows: a capacity of the smelting reduction furnace was 7 t; a content of carbon [C] was 1 to 2%; a total amount of oxygen supplied for decarbonization and post-combustion was 2,500 Nm³/Hr; and specific weight S of slag was 1 T. Nm³ means a volume of gas in the standard state of 1 atm. and 0° C. The specific weight of slag S is a weight of slag per ton of molten metal and represented with T/HMT. As shown in FIG. 3, when the post-combustion ratio was 0.15, the frequency of occurrence of the slopping was about 50%. This was a high frequency. When the post-combustion ratio was successively increased by either changing a height of the lance or relatively increasing the amount of gas supplied from the post-combustion nozzle, the frequency of occurrence of the slopping was decreased. When the post-combustion ratio was 0.3 or more, the occurrence of the slopping was not observed substantially.

Figure 4:
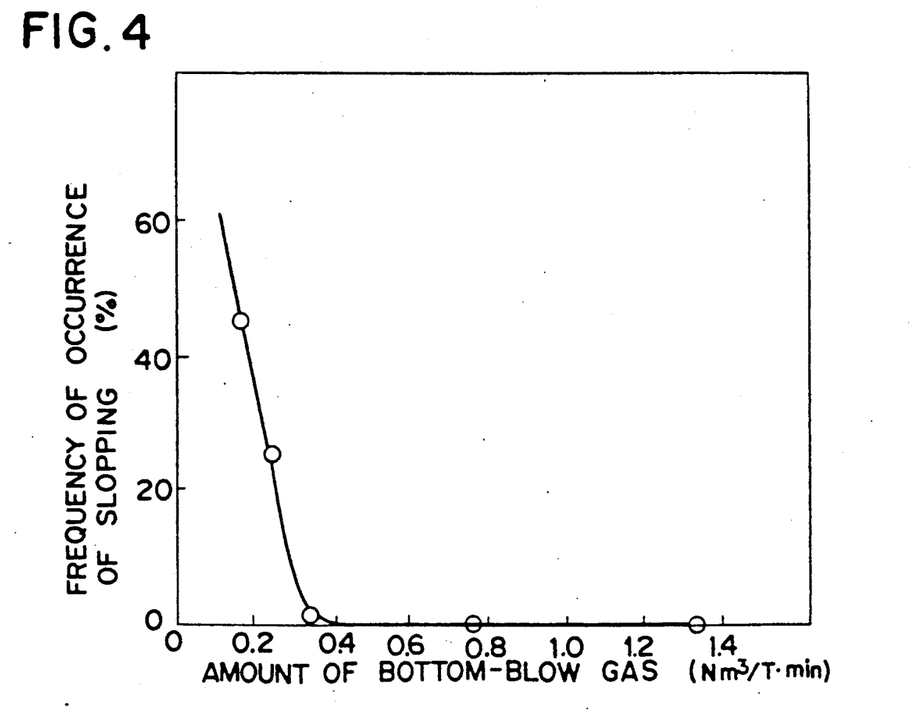
FIG. 4 is a graphical representation showing the relation between an amount of bottom-blow gas and the frequency of occurrence of the slopping of the present invention.

It is because produced energy increased when the post-combustion ratio was increased and, in connection with this, a charging amount of carbonaceous material was decreased and the amount of produced CO gas was decreased that the slopping does not occur. In this connection, heat produced by the post-combustion (CO+O→$CO_2$) was about 2.5 times as large as heat produced by the decarbonization (C+O→CO). In FIG. 4, the axis of abscissa is represented with a flow of bottom-blow gas per ton of molten metal. When the amount of bottom-blow gas is increased, the frequency of occurrence of the slopping is decreased. The frequency of occurrence of the slopping is decreased since said heat was effectively transferred to the molten metal by increasing the amount of the bottom-blow gas and a greater effect of the increase of the post-combustion ratio was demonstrated. The amount of bottom-blow gas is desired to be determined at 0.4 Nm³/min per ton of molten metal. Test conditions in FIG. 4 are the same as those in FIG. 3.

Figure 5:
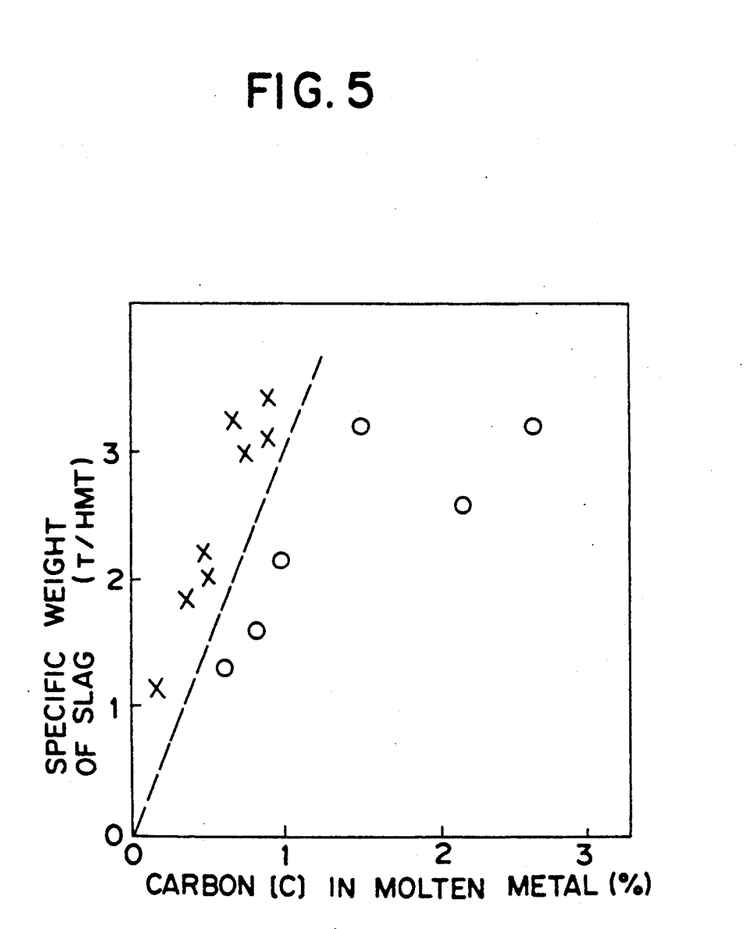
FIG. 5 is a graphical representation designating the relation between a content of carbon [C] in molten metal and a specific weight of slag relative to the slopping.

FIGS. 3 and 4 are graphical representations showing test results obtained under the condition of the specific weight of slag of 1 T/HMT. Since it was anticipated that, in case the specific weight S of slag was increased in this test, the occurrence of the slopping related to the content of carbon [C] in the molten metal, results obtained by studying this were shown in FIG. 5. FIG. 5 is a graphical representation designating the relation between a content of carbon [C] in molten metal and a specific weight of slag relative to the slopping. The post-combustion ratio at that time was 0.3 or more. Symbol ○ shows that there was no slopping and a stable operation was carried out. Symbol X shows that the slopping occurred and an unstable operation was carried out. A zone of stable operation where any slopping does not occur is shown with a boundary line drawn by a dashed line. In the graphical representation of FIG. 5, said boundary line can be represented by the following relational expression:

$$S(t/HMT) = 3[C].$$

Accordingly, a zone of stable operation where any slopping does not occur can be represented by the following relational expression:

$$S(t/HMT) \leqq 3[C].$$

After the completion of the smelting reduction of Ni ore as described above, slag is discharged from the smelting reduction furnace. Then, the molten metal is dephosphorized and desulfurized. 5.9 t of molten metal was dephosphorized by charging 507 kg of lime, 70 kg of fluorite, 70 kg of scale and 206 kg of coke into the smelting reduction furnace and supplying oxygen from the top-blow oxygen lance into the molten metal. 0.45 wt. % phosphorus [P] in the molten metal was reduced to 0.005 wt. %. Subsequently, slag was discharged from the smelting reduction furnace and the molten metal was desulphurized. 5.9 t of molten metal was desulphurized by charging 15.2 kg of lime, 10 kg of fluorite, 10 kg of silica and 526 kg of coke into the smelting reduction furnace and supplying oxygen from the top-blow oxygen lance. 0.6 wt. % sulfur [S] in the molten metal was reduced to 0.04 wt. % by this desulfurization.

Figure 6:
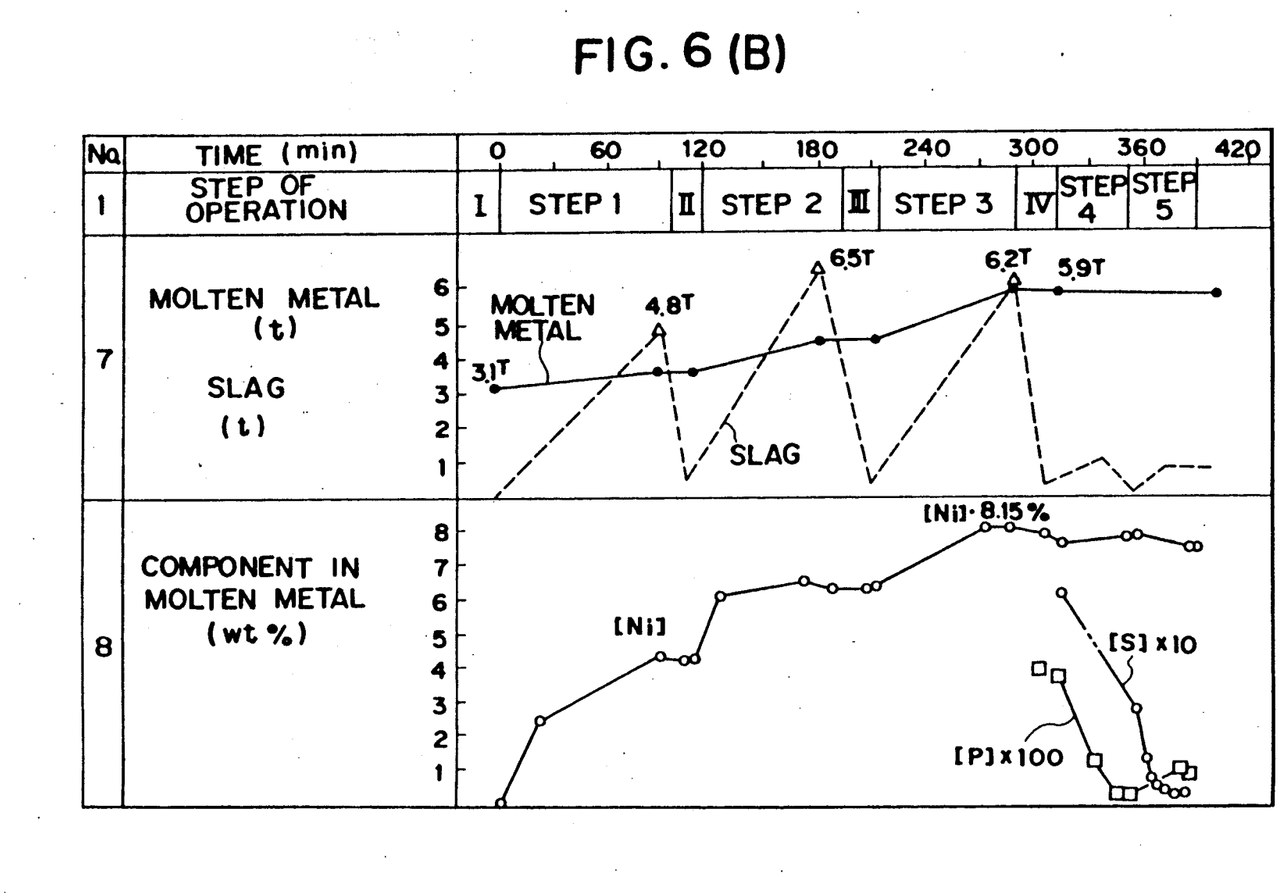
FIG. 6(A) and FIG. 6(B) is a graphical representation showing progression of operations during smelting reduction of Ni ore of the present invention.
Figure 6A:
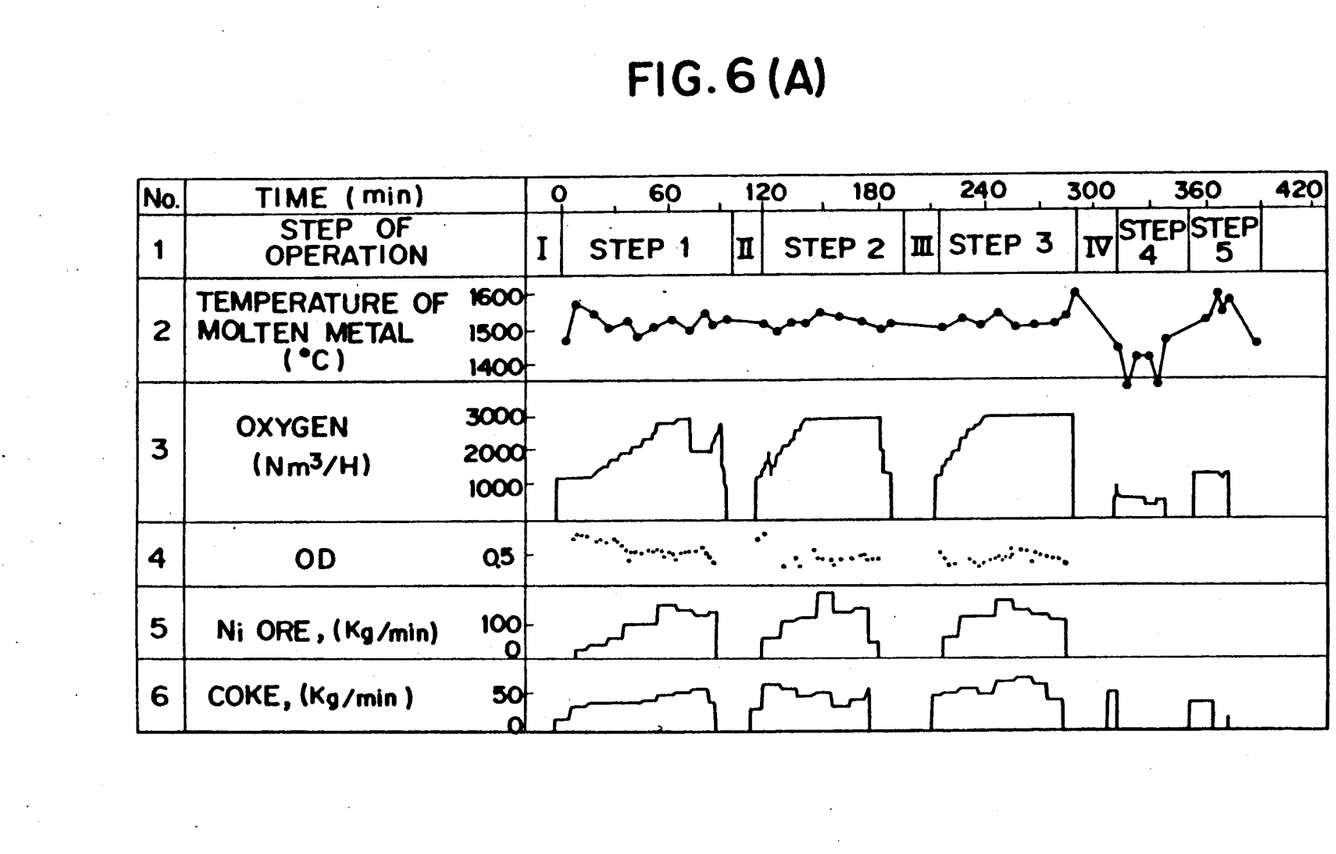

FIG. 6 (A) and FIG. 6 (B) show specifically an example of the process of smelting reduction of Ni ore on the basis of the above-described results. In this example, the post-combustion ratio was 0.3 or more and [C] in the molten metal was kept at a constant value of 1 to 2 wt. %. FIG. 6 (A) shows a change of ① the steps of operations, ② temperatures of molten metal, ③ a total amount of supplied oxygen, ④ the oxidation degree of exhaust gas from the smelting reduction furnace which corresponds to the post-combustion ratio, ⑤ the amount of charged Ni ore and ⑥ the amount of charged coke with the lapse of time. Numbers ① to ⑧ correspond to Nos. 1 to 8 in FIG. 5. At the step of operations ①, initially, 3.1 t of molten iron was charged into the smelting reduction furnace (charge of molten iron of I). Then, the smelting reduction at the steps of 1 to 3 and the discharge of slag of II to IV were repeatedly carried out. Thereafter, the dephosphorization of step 4 and the desulfuration of step 5 were carried out. The temperature of molten metal ② was raised by the charge of coke when the temperature of the molten metal rose and exceeded 1500° C. Flat portions in the graphical representations of the amount of supplied oxygen ③, the amount of charged Ni ore ⑤ and the amount of charged coke ⑥ represents 2900 Nm³/Hr, 120 kg/min and 59 kg/min, respectively.

The amount of slag ⑦ was naturally decreased every time the slag was discharged. A peak of the amount of slag was 4.8 to 6.2 T as shown in FIG. 6. An initial amount of 3.1 t of molten metal ⑦ in the smelting reduction furnace was finally increased to 5.9 t, Ni ore being smelted and reduced and Ni or Fe being added to the molten metal. Relative to the content of Ni ⑧ in the molten metal, a high content of 4.5 wt. % Ni was obtained on the occasion of the first discharge of slag and the Ni content in the molten metal was 8.15 wt. % after Ni ore had been three times charged into the smelting reduction furnace.

The process of smelting reduction of Cr ore carried out as described above after the completion of the smelting reduction, dephosphorization and desulfurization of Ni ore will be described. Cr ore, carbonaceous material and flux were put into molten metal in said smelting reduction furnace 10. The present invention is not limited to the use of Cr ore as Cr material, but the case of using Cr ore as a source of Cr will be described here. As in the case of the smelting reduction of Ni ore, oxygen is blown into the smelting reduction furnace from the top-blow oxygen lance and post-combustion nozzle and stirring gas is blown from the bottom-blow tuyere 24 from the first step to the last step of the smelting reduction treatments of Cr ore. During the smelting reduction of Cr ore, the stirring gas is blown into the smelting reduction furnace from the side-blow tuyere 25 in addition to the blowing of the stirring gas from the bottom-blow tuyere 24.

Oxygen as stirring gas blown from the side-blow tuyere 25 is desired not to be used as in the case of the foregoing bottom-blow gas. When oxygen is used as the side-blow gas, C in the molten metal which has been mixed with slag by the stirring gas reacts with oxygen and this prevents Cr ore from being reduced. Moreover, as in the case of the bottom-blow tuyere, there occurs a problem of damage to refractory.

Figure 7:
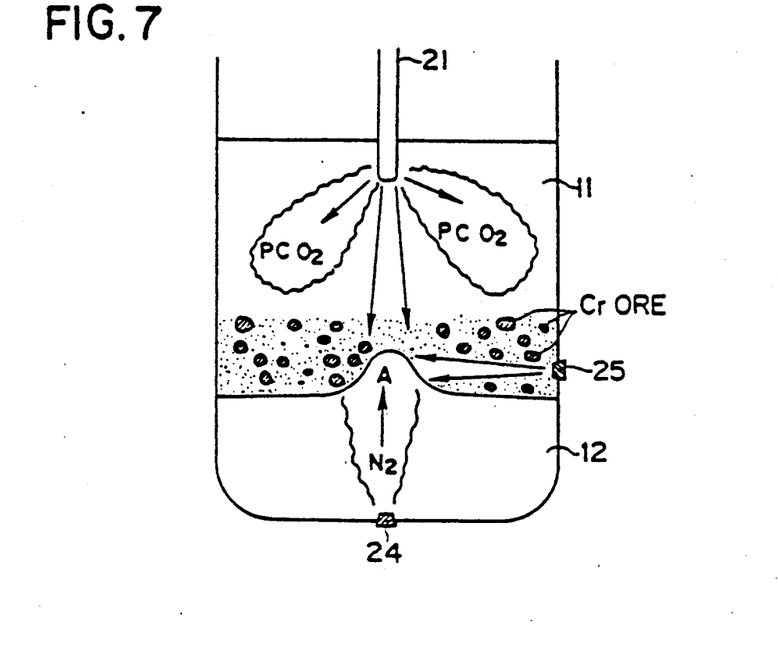
FIG. 7 is a schematic illustration showing the results of bottom-blow and side-blow of stirring gas blown into molten metal during the smelting reduction of Cr ore of the present invention.

FIG. 7 is a schematic illustration of the process of smelting reduction of Cr ore by the use of the smelting reduction furnace shown in FIG. 1. Since chromium oxide in Cr ore is hard to melt, an increase of the reduction rate of Cr is not expected when the chromium oxide is reduced after Cr ore has been melted. To actively promote the reduction of Cr ore by means of C in molten metal, stirring gas is blown from the side-blow tuyere 25 into a lower portion of slag layer 11 where Cr ore is suspended. Cr ore is mixed with the molten metal. The molten metal is mixed with slag under a joint work of both of blowing of gas from the bottom-blow tuyere 24 and blowing of gas from the side-blow tuyere 25. The rate of reduction is increased rapidly. In this process, a swollen portion of molten metal shown by A in FIG. 7 is formed by stirring gas supplied from the bottom-blow tuyere 24. At the same time, stirring gas is supplied so that at least a part of a gas flow from the side-blow tuyere 25 can strike said swollen portion (A). Molten metal in the swollen portion (A) is scattered into the slag by the side-blow gas. An apparent density of slag is usually 0.5 to 1.0. Accordingly, most of Cr ore in the slag is suspended in the slag, being concentrated in the lower portion of the slag layer. When the swollen portion (A) of molten metal is scattered by the side-blow gas as described above, this scattered molten metal is mixed with Cr ore in the lower portion of the slag layer 11 and C in the scattered molten metal reduces chromium oxide at a high reduction rate.

Figure 8A:
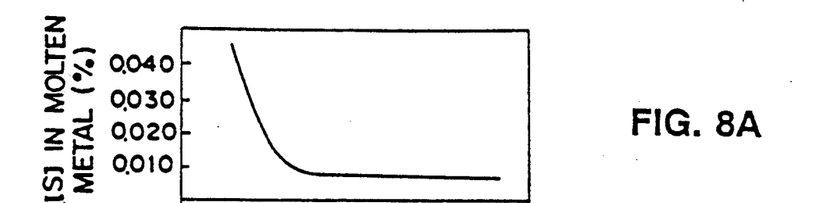
FIGS. 8A, 8B and 8C are three graphs showing the relation among a unit consumption of coke per ton of molten metal, P component in molten metal and S component in molten metal relative to a change of the post-combustion inside the smelting reduction furnace during the smelting reduction of Cr ore of the present invention.
Figure 8B:
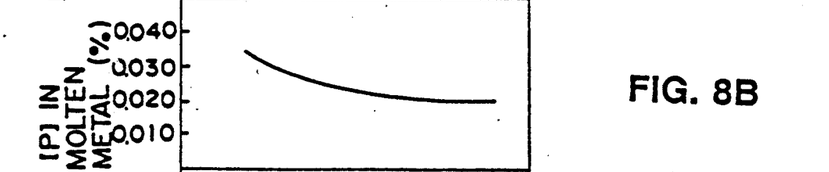
Figure 8C:
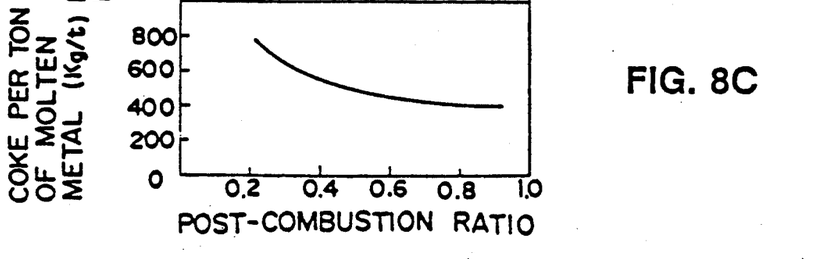

Cr ore is reduced with the post-combustion ratio of 0.3 or more in the smelting reduction of Cr ore as well. Moreover, a high heat transfer efficiency can be obtained by the joint work of the bottom-blowing and side-blowing. Therefore, the unit consumption of carbonaceous material per ton of molten metal can be limited low. Since most of P component in the molten metal is brought into the molten metal by carbonaceous material, the P component in the molten metal is decreased when the amount of charged carbonaceous material is kept at a low level. From this point of view, the post-combustion ratio is determined at 0.3 or more. FIG. 8 shows the relation among the unit consumption of coke, the P component and the S component in molten metal relative to the change of the post-combustion ratio inside the smelting reduction furnace. The unit consumption of coke and P and S in the molten metal are decreased by controlling the post-combustion ratio at 0.3 or more.

Figure 9:
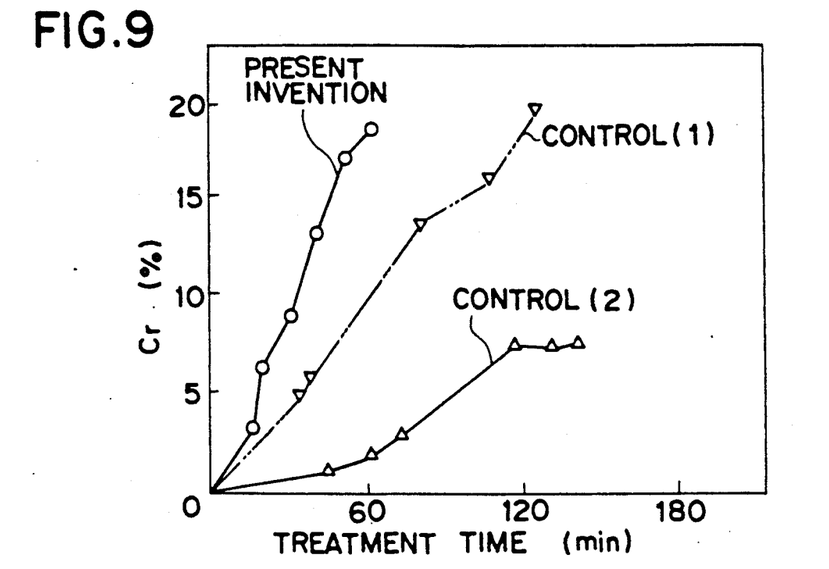
FIG. 9 is a graphical representation indicating a period of time for the smelting reduction of Cr ore of the present invention.
Figures 10A, 10B:
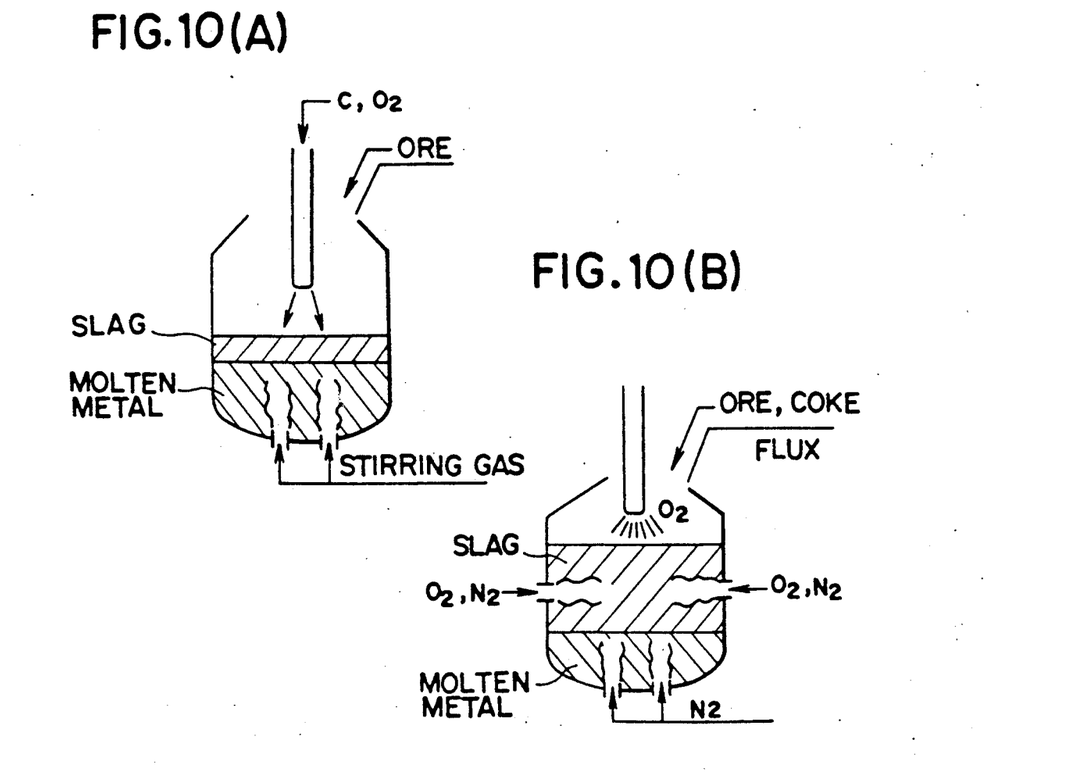
FIG. 10(A) and FIG. 10(B) are schematic diagrams showing the smelting reduction method of a Control.

FIG. 9 shows a comparison of a treatment time of the smelting reduction in the smelting reduction of Cr ore in the present invention in comparison with a treatment time according to a Control shown in FIG. 10. The treatment time is a time from the beginning to the end of the reduction. In FIG. 10 (A), a method of Control (1) wherein fine coal and oxygen are blown from the top-blow lance and stirring gas is blown from the bottom-blow tuyere is shown. In FIG. 10 (B), a method of Control (2) wherein oxygen is blown on the slag from the top-blow lance and simultaneously oxygen or nitrogen is blown from the side-blow tuyere and nitrogen is blown from the bottom-blow tuyere is shown. Specific operation conditions are as follows:

| Control (1) | | |
|---|---|---|
| Top-blow oxygen | 1700 Nm³/Hr | (on the occasion of finish reduction) |
| Bottom-blow nitrogen | 350 Nm³/Hr | (on the occasion of |

| | | |
|---|---|---|
| | | finish reduction |
| Molten iron | 10 tons | |
| Cr ore | 4600 kg | (injected from a lance) |
| Carbonaceous material | 6700 kg | (injected from a lance) |
| Control (2) | | |
| Top-blow oxygen | 1000 Nm³/Hr | (on the occasion of finish reduction) |
| Bottom-blow nitrogen | 120 Nm³/Hr | (on the occasion of finish reduction) |
| Side-blow nitrogen | 350 Nm³/Hr | (on the occasion of finish reduction) |
| Molten iron | 5 tons | |
| Cr ore | 5000 kg | (thrown into smelting reduction furnace) |
| Carbonaceous material | 3200 kg | (thrown into smelting reduction furnace) |

Figure 11:
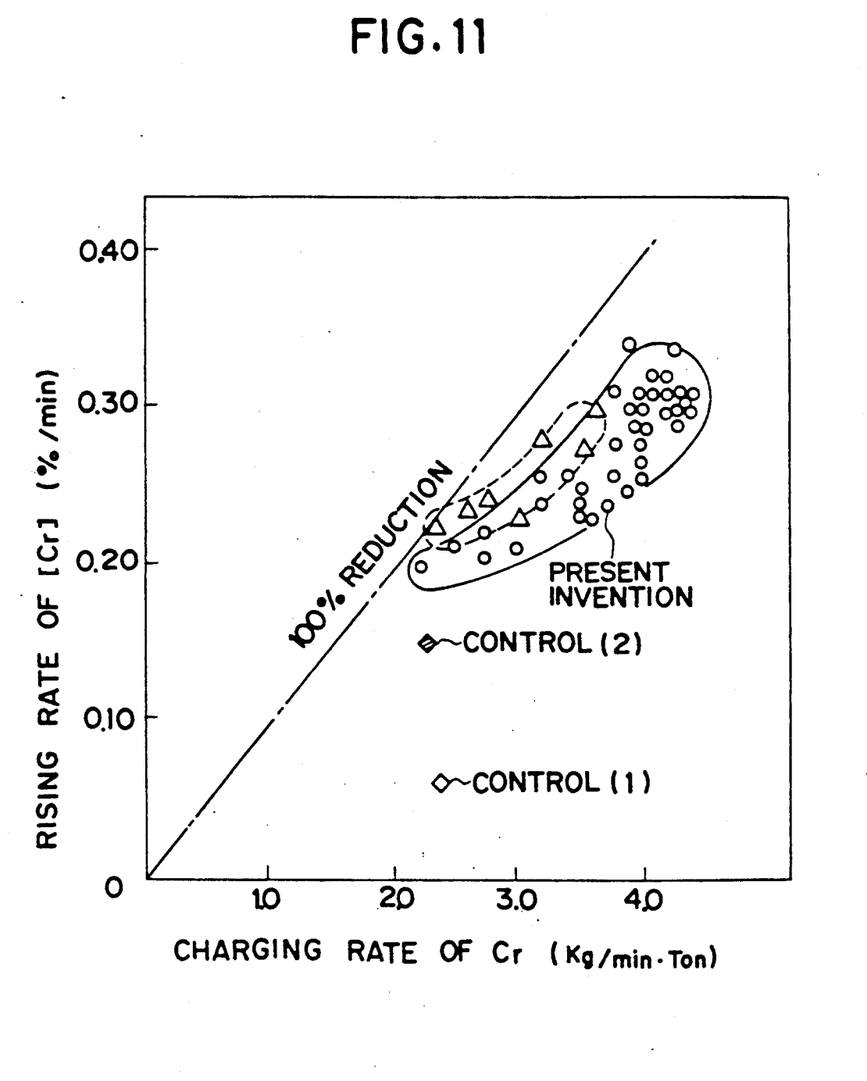
FIG. 11 is a graphical representation designating a rising rate of Cr in molten metal relative to a charging rate of pure Cr of the present invention.

According to FIG. 9, in Control (2), the concentration of Cr was only 6 to 7 wt. %. In Control (1), the concentration of Cr reached an objective of 18 wt. %, but it took 120 minutes for processing Cr ore. According to the process of smelting reduction of Cr of the present invention, the concentration of Cr reached 18 wt. % in which is a half of the processing time in Control (1). This demonstrates an extremely good capability of the present invention in processing Cr ore. FIG. 11 shows the result of having studied a rising rate of Cr component in the molten metal relative to a charging rate of pure Cr in the example of the present invention. The charging rate of pure Cr is a charging rate of Cr ore which is calculated in terms of an amount of pure Cr. In the process of smelting reduction of Cr ore of the present invention, a high rising rate of Cr could be obtained compared with the rising rate of Cr in Controls (1) and (2). ○ and Δ in FIG. 11 show data obtained by the process of smelting reduction of Cr ore of the present invention. ○ shows data obtained by having used pellets of Cr ore of 10 mm in particle size as Cr material. Δ shows data obtained by having used Cr ore of 1 mm or less in particle size.

After Cr ore has been reduced as described above, slag is discharged and molten metal containing Cr and Ni is sucessively subjected to a decarbonization treatment in the same furnace. The decarbonization treatment is carried out by blowing oxygen into the smelting reduction furnace from the top-blow oxygen lance and simultaneously by blowing stirring gas tuyeres mounted on the smelting reduction furnace. In this case, not pure oxygen, but oxygen diluted by inert gas is desired to be blown. This decarbonization treatment is carried out at atmospheric pressure on the following condition:

① Oxygen is blown exclusively from the top-blow lance 21, but not blown from the bottom-blow tuyere.

② Not pure oxygen, but oxygen diluted by inert gas is supplied from the top-blow lance 21.

③ Molten metal is strongly stirred by blowing inert gas from the bottom-blow tuyere 24.

The reason for the above-described ① to ③ will be described. In an AOD method having previously been known, a method wherein oxygen is blown from a tuyere at the bottom of a furnace is employed. According to the study of the present inventors, it was understood that bottom-blow oxygen was a cause of increasing the oxidation loss of Cr. That is, since a static pressure of molten steel is increased due to the bottom-blow of oxygen and a partial pressure of CO is increased, a decarbonization reaction is prevented. In consequence, the bottom-blow of oxygen is not used, but oxygen is supplied from the top-blow lance 21 in the present invention.

It was understood, however, that the oxidation loss of Cr could not be appropriately prevented by blowing only oxygen from the top-blow lance. The reason for this is considered as follows: a decarbonization reaction occurs most violently at a fire spot produced by oxygen supplied from the top-blow lance. The partial pressure of CO in this portion is raised very high by supplying only oxygen. As a result, the decarbonization reaction is prevented and oxygen oxidizes Cr. Therefore, in the present invention, oxygen diluted by inert gas ($N_2$, Ar or the like) is blown from the top-blow lance and the decarbonization reaction is promoted by lowering the partial pressure of CO at the fire spot. In order to shorten a time for decarbonization treatment, a great amount of gas is desired to be blown from the top-blow lance.

In the present invention, inert gas is blown from the bottom-blow tuyere 24 to stir molten metal in order to promote a mixing of the molten metal with oxygen blown from the top-blow lance. An effective decarbonization processing with limitation of the Cr oxidation loss can be realized by a combination of a strong stirring by means of inert gas from the bottom-blow tuyere and the top-blow of oxygen diluted by inert gas from the top-blow lance.

A great amount of inert gas is required to be blown into the smelting reduction furnace to strongly stir the molten metal. Specifically to limit the oxidation loss of Cr to 1% or less, inert gas is required to be blown at 0.5 Nm³/min or more per ton of molten metal. To limit the oxidation loss of Cr to 0.5% or less, inert gas is required to be blown at 1 Nm³/min or more per ton of molten metal. However, when an excessive amount of gas is blown, the molten metal can scatter. Therefore, bottom-blow gas is blown at 0.5 to 5 Nm³/min, preferably at 1 to 3 Nm³/min per ton of molten metal in the method of the present invention.

Figure 12:
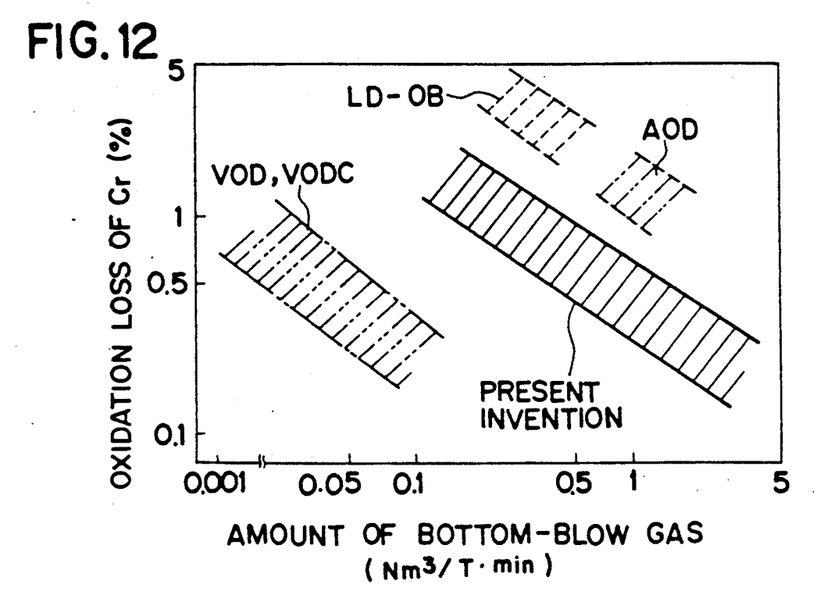
FIG. 12 is a graphical representation indicating the relation between an amount of the bottom-blow gas and an oxidation loss of Cr of the present invention.

FIG. 12 shows the relation between the amount of bottom-blow gas and the oxidation loss of Cr in the decarbonization process of the present invention. Oxygen is effectively used by blowing a great amount of gas from the bottom-blow tuyere and the oxidation loss of Cr is appropriately limited.

For comparison, the relation between the amount of bottom-blow gas and the Cr oxidation loss in the prior art decarbonization method is shown. In a method such as an AOD method or the like, for example, the ratio of the oxidation loss of Cr to the amount of bottom-blow gas is very large.

It is effective to decrease the amount of supplied oxygen with a decrease of carbon [C] in the molten metal in the above-described decarbonization treatment so as to more appropriately prevent the oxidation loss of Cr. However, generally decreasing the amount of supplied oxygen by means of the same nozzle in a supply of oxygen by the use of the top-blow lance has a limit in terms of a fall of blowing pressure. Therefore, the amount of supplied oxygen can be decreased to only about one half of a maximum amount of supplied gas. As against the above-described problem, it is preferable to successively increase a percentage of inert gas for diluting oxygen in the top-blow gas in the course of blowing with a progress of decarbonization whereby the amount of supplied oxygen can be decreased without excessively lowering the pressure of blowing.

The increase of inert gas and the decrease of supplied oxygen can be successively or step by step carried out. A specific method of this gas blowing will be described. Oxygen diluted by inert gas is blown from the top-blow lance. The amount of gas blown from the top-blow lance is kept constantly at 3 Nm³/min per ton of molten metal. The amount of supplied oxygen is changed in accord with a level of carbon in the molten metal.

| | |
|---|---|
| C: 3% or more | 3 Nm³/min per ton of molten metal |
| C: from less than 3% to 2% | 2 to 3 Nm³/min/per ton of molten metal |
| C: from less than 2% to 0.5% | 1 to 2 Nm³/min per ton of molten metal |
| C: less than 0.5% | 1 Nm³/min per ton of molten metal |

The content of carbon [C] in the molten metal subjected to decarbonization treatment can be known by the presumption on the basis of an accumulated amount of blowing oxygen or by measurement of a temperature of solidification of molten metal sampled during the decarbonization treatment.

Figure 13:
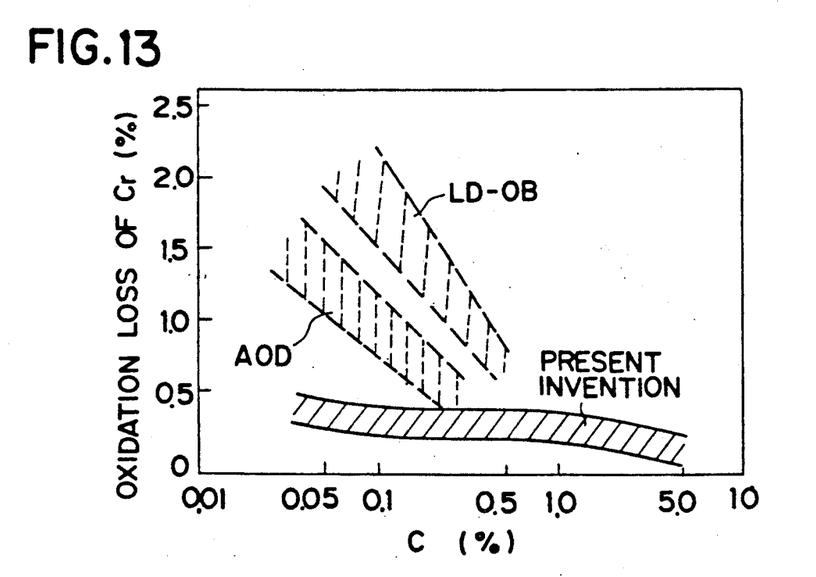
FIG. 13 is a graphical representation showing the relation between the oxidation loss of Cr and the content of C in molten metal of the present invention.

In a specific example relative to the oxidation loss of Cr in the decarbonization treatment, wherein the same operation conditions as those at the steps of the operations shown in FIG. 14 which will be described later, the content of carbon [C] in molten metal was decreased from 6.7% to 0.038% for about 40 minutes by subjecting the molten metal to the decarbonization treatment. Notwithstanding the molten metal was decarbonized to a range of low carbon, the oxidation loss of Cr was about 0.5%. This value was very low. The molten metal was decarbonized under the above-described conditions by changing decarbonization level and the relation of the decarbonization level to the Cr oxidation loss was studied. FIG. 13 shows a comparison of the result with Controls (the AOD method and LD-OB method).

In the example of the present invention, it is understood that the oxidation loss of Cr was limited sufficiently low even in the range of low carbon.

Figure 14:
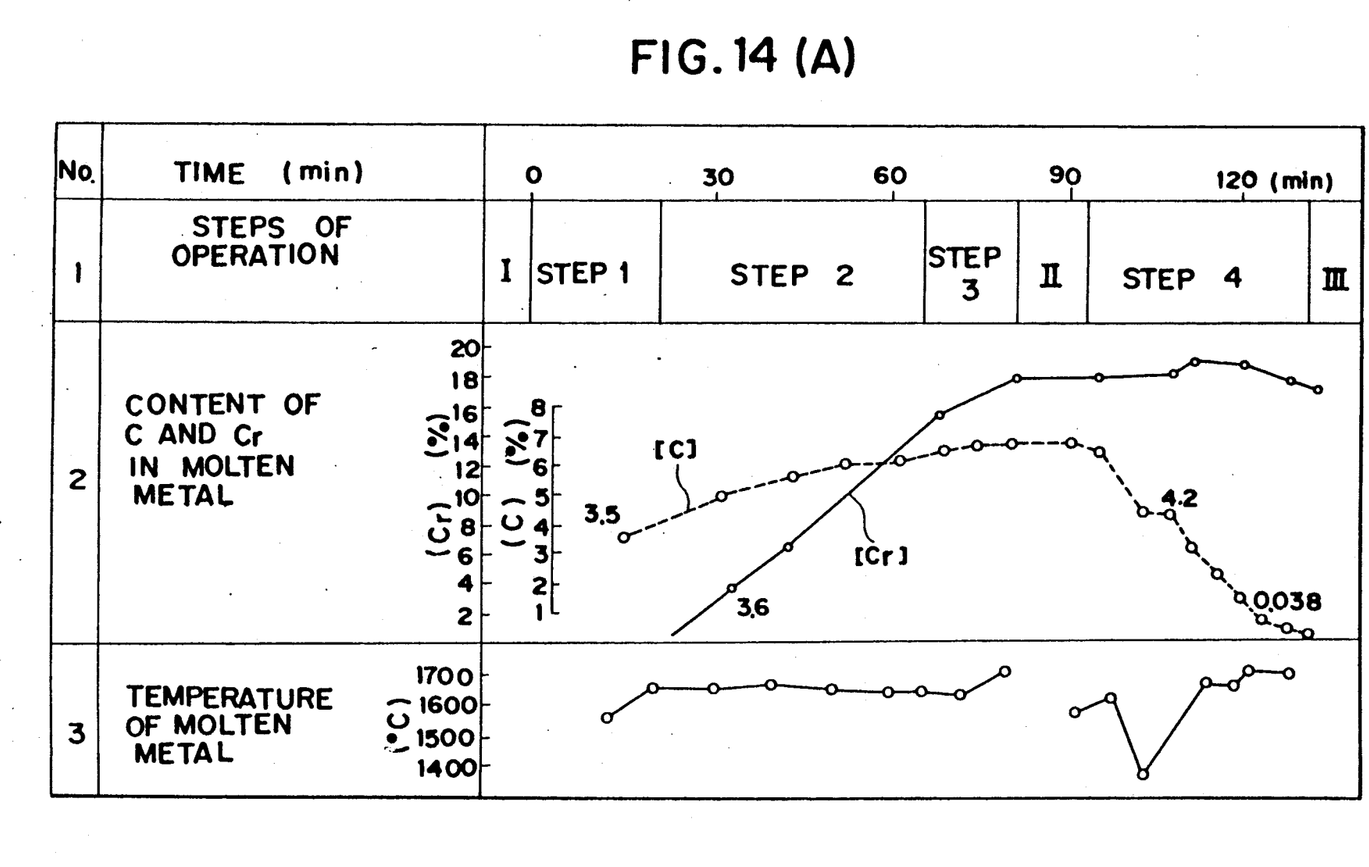
FIG. 14(A) and FIG. 14(B) are graphical representations showing a change of parameters of various operations in the smelting reduction and decarbonization treatment, to which a Cr source is subjected after the smelting reduction of Ni ore.

FIG. 14 (A) and FIG. 14 (B) show specifically examples of favorable operations of the process of smelting reduction of Cr ore and the decarbonizarion process which are carried out after the smelting reduction of Ni ore. Those FIGS. show the processes which follow the dephosphorization and desulfuration at the steps of operations in the process of smelting reduction of Cr ore shown in FIG. 6 (A) and FIG. 6 (B). FIG. 14 (A) shows the change of ① the operation steps, ② the content of C and Cr in the molten metal and ③ a temperature of the molten metal with the lapse of time. FIG. 14 (B) shows the change of ① the operation steps, ④ the amount of oxygen and inert gas blown from the lance, ⑤ the height of the lance, ⑥ the amount of bottom-blow gas, ⑦ the amount of side-blow gas, ⑧ the amount charged Cr ore, and ⑨ the amount of charged coke. Numbers of ① to ⑨ correspond to Nos. 1 to 9 of FIG. 14 (A) and FIG. 14 (B).

At the operation step ①, the production of slag and rise of temperatures at the step 1 after the discharge of slag (1), the smelting reduction of Cr ore at the step 2 and the finish reduction at the step 3 are carried out. Out of step 1 to step 3 the amount of oxygen ④ blown from the lance, the amount of post-combustion oxygen is shown with oblique lines and the amount decarbonization oxygen with a void portion. Successively, the decarbonization at the step 4 which follows the dischage of slag (11) is carried out. The amount of oxygen and N₂ blown from the lance during the decarbonization is shown with the void portion and the oblique lines, respectively.

Subsequently, an overall effect of the present invention will be decribed. Since oxygen for decarbonization and post-combustion is blown into a smelting reduction furnace, into which molten iron, Ni ore, carbonaceous material and the like are charged, and stirring gas is blown from the bottom of the smelting reduction furnace whereby a post-combustion ratio is made to be 0.3 or more, any slopping does not occur. Therefore, a stable operation can be carried out and the yield of Ni of 90% or more can be secured. Thereafter, Cr material is smelted and reduced by blowing stirring gas from tuyeres fitted to the smelting reduction furnace into the smelting reduction furnace and stirring the molten metal. Therefore, a reduction rate of the Cr material can be greatly increased and the smelting reduction of the Cr material can be effectively carried out in a short time. Further, since oxygen is blown from the top-blow lance into the smelting reduction furnace and simultaneously stirring gas is blown in a decarbonization treatment of the molten metal, the oxidation loss of Cr is decreased. Moreover, since the above-described steps from the smelting reduction to the decarbonization are carried out in the same smelting reduction furnace, a manufacture of stainless steel by the use of Ni ore and Cr ore as materials can be carried out by means of simple eqipment and a short time treatment with high productivity and low cost.

What is claimed is:

1. A method for manufacturing molten metal containing Ni and Cr, comprising:

step (a) smelting and reducing Ni ore, comprising the steps of:
charging molten iron into a smelting reduction furnace having a top-blow oxygen lance with a decarbonization nozzle and a post-combustion nozzle and having at least one first tuyere for blowing a stirring gas;
charging Ni ore, carbonaceous material and flux into said smelting reduction furnace;
blowing decarbonization oxygen and post-combustion oxygen from said top-blow oxygen lance into said smelting reduction furnace;
blowing said stirring gas from said first tuyere thereby stirring the molten metal and slag inside the smelting reduction furnace; and
controlling a post-combustion ratio of $((H_2O+CO_2)/(H_2+H_2O+CO+CO_2))$ at 0.3 or more
and then
step (b) smelting and reducing Cr ore, comprising:
charging Cr ore, carbonaceous material and flux into the smelting reduction furnace which contains molten metal containing Ni from step (a);
blowing decarbonization oxygen and post-combustion oxygen from said top-blow oxygen lance into said smelting reduction furnace;
blowing said stirring gas from said first tuyere thereby stirring the molten metal and slag inside the smelting reduction furnace; and
controlling a post-combustion ratio of $((H_2O+CO_2)/(H_2+H_2O+CO+CO_2))$ at 0.3 or more.

2. The method of claim 1, wherein said process of smelting and reducing Ni ore further comprises controlling a relation between a carbon content (C) (%) in the molten metal and a weight of slag produced per weight of molten metal defined as S, so as to satisfy a formula of:

$$S[(t/HMT)] \leq 3(C)(\%).$$

3. The method of claim 1, wherein said stirring gas in the process of smelting and reducing Ni ore is blown from a bottom-blow second tuyere disposed in the bottom of the smelting reduction furnace.

4. The method of claim 3, wherein said stirring gas is blown at a rate of 0.4 Nm$^3$/min or more per ton of molten metal.

5. The method of claim 1, wherein said top-blow oxygen lance in the process of smelting and reducing Ni ore is controlled so that an end of said oxygen lance is in a slag layer.

6. The method of claim 1, wherein said top-blow oxygen lance in the process of smelting and reducing Cr ore is controlled so that the end of said oxygen lance is in a slag layer.

7. The method of claim 1, wherein said stirring gas from said first tuyere in the process of smelting reducing Cr ore is blown so that at least a part of said stirring gas can strike a swollen portion of molten metal produced by stirring gas from a bottom-blow tuyere.

8. The method of claim 7, wherein said stirring gas from the bottom-blow second tuyere is blown at 0.5 to 5 Nm$^3$/min per ton of molten metal.

9. The method of claim 8, wherein said stirring gas from the bottom-blow second tuyere is blown at 1 to 3 Nm$^3$/min.

10. The method of claim 1, wherein said stirring gas in the smelting and reducing Ni ore is a gas selected from the group consisting of CO, N$_2$ and Ar.

11. The method of claim 1, wherein said stirring gas in the smelting and reducing Cr ore is a gas selected from the group consisting of CO, N$_2$ and Ar.

12. The method of claim 1, which further comprises,
step (a) a dephosphorization to remove phosphorus comprising:
discharging slag after conducting said smelting and reducing of Ni ore;
charging lime, fluorite, scale and carbonaceous material into the smelting reduction furnace; and
blowing oxygen from the top-blow oxygen lance, and
step (b) a desulphurization to remove sulfur comprising:
discharging slag and charging lime, flurorite, silica and carbonaceous material into the smelting reduction furnace; and
blowing oxygen from the top-blow oxygen lance.

13. The method of claim 1, which further comprises a process for decarbonizing molten metal containing Ni and Cr;
said decarbonization process comprising:
blowing oxygen diluted by inert gas from the top-blow oxygen lance; and
blowing stirring gas for stirring molten metal and slag inside the smelting reduction furnace from the tuyeres.

14. The method of claim 2, wherein during the process of smelting and reducing of Ni ore, said stirring gas is a gas selected from the group consisting of CO, N$_2$ and Ar, said stirring gas is blown from a bottom-blow second tuyere of the smelting reduction furnace at a rate of 0.4 Nm$^3$/minute or more per ton of molten metal; and said top-blow oxygen lance is controlled so that an end of said oxygen lance is in a slag layer.

15. The method of claim 6, wherein during the smelting and reducing of Cr ore, said stirring gas is a gas selected from the group consisting of CO, N$_2$ and Ar, said stirring gas from said first tuyere is blown so that at least a portion of the stirring gas strikes a swollen portion of molten metal metal produced by stirring gas blown from a bottom-blow second tuyere, and said stirring gas from said bottom-blow second tuyere is blown at a rate of 0.5 to 5 Nm$^3$/minute per ton of molten metal.

16. The method of claim 1, wherein said at least one first tuyere is disposed in a side of said smelting reduction furnace.

17. The method of claim 14, wherein during the smelting and reducing of Cr ore, said stirring gas is a gas selected from the group consisting of CO, N$_2$ and Ar, said stirring gas from said first tuyere is blown so that at least a portion of the stirring gas strikes a swollen portion of molten metal produced by stirring gas blown from a bottom-blow second tuyere, and said stirring gas from said bottom-blow second tuyere is blown at a rate of 0.5 to 5 Nm$^3$/minute per ton of molten metal.

18. The method of claim 17, wherein said at least one first tuyere is disposed in a side of said smelting reduction furnace.

* * * * *